April 14, 1925.  1,533,755

F. L. ODENBREIT

BRAKE EQUALIZER

Filed July 3, 1923

Witness.
Wm T Hull

Inventor
FRANK L. ODENBREIT.
By Hazard and Miller
Attorneys

Patented Apr. 14, 1925.

1,533,755

UNITED STATES PATENT OFFICE.

FRANK L. ODENBREIT, OF LONG BEACH, CALIFORNIA.

BRAKE EQUALIZER.

Application filed July 3, 1923. Serial No. 649,242.

*To all whom it may concern:*

Be it known that I, FRANK L. ODENBREIT, a citizen of the United States, residing at Long Beach, in the county of Los Angeles and State of California, have invented new and useful Improvements in Brake Equalizers, of which the following is a specification.

My invention relates to brake equalizing devices, and a purpose of my invention is the provision of an actuating and equalizing device for brakes of simple, durable, and efficient construction, and one which is thoroughly effective to automatically equalize the braking action of a plurality of brakes.

It is also a purpose of my invention to provide an actuating and equalizing device which is particularly adapted, although not necessarily, to the brakes of a drum or windlass for hoisting and lowering a drill cable.

Although I have herein shown and will describe only one form of brake actuating and equalizing device embodying my invention, it is to be understood that various changes and modifications may be made herein without departing from the spirit of the invention and the spirit and scope of the appended claims.

In the accompanying drawings.

Figure 1:
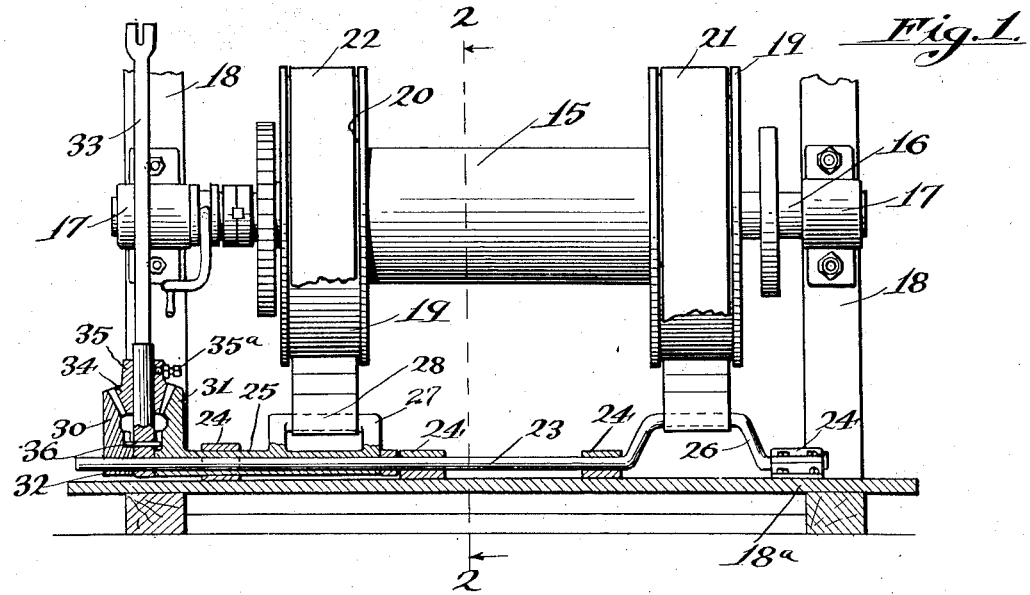
Fig. 1 is a view showing in front elevation a cable drum and its brakes having applied thereto one form of brake actuating and equalizing device embodying my invention, the latter being shown partly in section.

Referring specifically to the drawings in which similar reference characters refer to similar parts, my invention in its present embodiment is shown as applied to a cable drum 15 supported for rotational movement upon a shaft 16 journaled in bearings 17 supported on uprights 18 fixed to a base 18ª. The opposite ends of the drum 15 are formed with brake drums 19 and 20 grooved to receive brake bands 21 and 22, respectively.

The actuating and equalizing device embodying my invention comprises in the present instance a solid shaft 23 journaled in bearings 24 secured to the base 18ª, and a tubular shaft 25 surrounding and loosely fitted on a portion of the shaft 23. The shafts 23 and 25 are provided with cranks 26 and 27, respectively, which are loosely mounted in the sleeves 28 permanently secured to one of the ends of the brake bands 21 and 22. The opposite ends of the bands 21 and 22 are connected to the base 18ª through connections 29 which are adjustable to raise or lower the corresponding ends of the bands so as to vary the braking action of the bands with respect to the drums 19 and 20.

Figure 3:
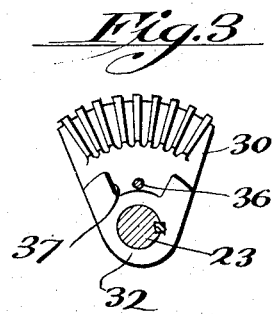
Fig. 3 is an enlarged detailed view showing in side elevation one of the sector gears embodied in the device shown in the preceding views, with adjacent portions in section.

As clearly shown in Fig. 1, a pair of sector gears 30 and 31 are respectively fixed to or formed integral with the left hand end of the shafts 23 and 25, both gears having hub portions 32 which receive the shaft 23. As shown in Fig. 3, the shaft 23 is keyed to the hub portion 32 of the gear 30, and it will be understood that the shaft 23 is loosely fitted in the hub of the gear 31 so as to permit the latter to move independently of the former. Between the gears 30 and 31 an operating lever 33 is pivotally mounted on the shaft 23, and this lever carries a beveled pinion 34 rotatably mounted on the lever and held against upward movement on the lever by a hub or collar 35 shown as integral therewith and secured to the lever by a set screw 35ª. The pinion 34 is arranged to constantly mesh with the gears 30 and 31 and to effect actuation of such gears upon the movement of the lever 33.

To prevent the accidental disengagement of the pinion 34 from the gears 30 and 31 during rocking movement of the lever 33, I provide a projecting element such as a stop pin 36 shown as extended through the lever 33, as clearly shown in Fig. 1, and in such manner that its opposite ends are disposed within limiting channels or recesses 37 formed in the confronting sides of the gears 30 and 31, as clearly shown in Fig. 3. By this arrangement it will be seen that the rocking movement of the lever 33 in both directions is limited by the pin 36 engaging the end walls of the recesses 37. This naturally maintains the beveled gear 34 in engagement with the sector gears at all times.

Figure 2:
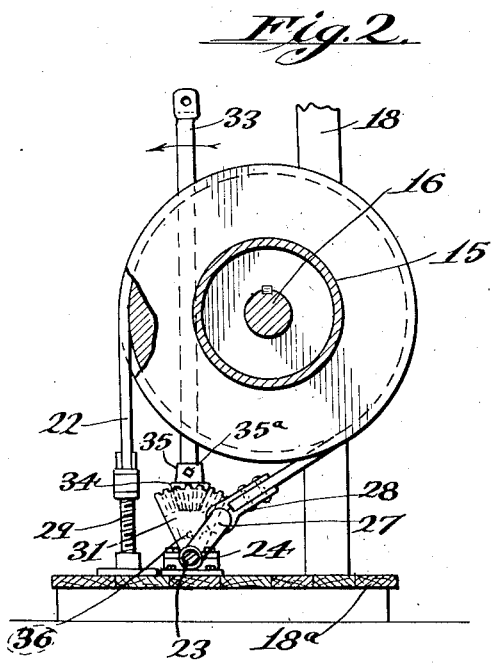
Fig. 2 is a vertical sectional view taken on the line 2—2 of Fig. 1.

In operation, the lever 33 normally occupies a position in which the cranks 26 and 27 are so arranged that the brake bands 21 and 22 have loose engagement with the peripheries of the drums 19 and 20, so that free rotation of the cable drum 15 is permitted. To apply the brakes, the lever 33 is moved in the direction of the arrow in Fig. 2, thereby imparting a similar movement to the sector gears 30 and 31 through the medium of the pinion 34. Upon movement of the sector gears the shafts 23 and 25 are partly rotated to effect actuation of the cranks 26 and 27 so as to constrict the bands 21 and 22 about the drums 19 and 20. Should the constricting action of one band be in excess of that of the other, the corresponding sector gear of the first band will not tend to move with the lever 33, while the sector gear for the other band will continue to move with the lever. This differential action is permitted by virtue of the pinion 34, the latter rotating upon the lever 33 to allow continued movement of the lever independently of that sector gear for that brake band which is excessively constricted.

From the foregoing operation, it will be manifest that the gears 30, 31 and 34 cooperate to equalize the constricting action imparted to the two brake bands by the actuation of the lever 33 so that equal braking action is exerted upon the brake drums at all times.

What I claim is:

1. In combination, a pair of brake bands having one of their ends fixed, a pair of shafts one of which extends through the other, eccentric connections between said shafts and the other end of said bands, segmental gears fixed to said shafts, an operating lever, and a gear rotatable on the lever, said gear being arranged between and meshing with both of the first segmental gears.

2. In combination, a pair of brake bands having one of their ends fixed, a pair of shafts, eccentric connections between said shafts and the other end of said bands, gears fixed to said shafts, an operating lever, a gear rotatable on the lever, said gear being arranged between and meshing with both of the first gears, and means for limiting the movement of the lever with respect to the first gears.

3. In combination, a pair of brake bands having one of their ends fixed, a pair of shafts, eccentric connections between said shafts and the other end of said bands, gears fixed to said shafts, an operating lever, a gear rotatable on the lever, said gear being arranged between and meshing with both of the first gears, and means for limiting the movement of the lever with respect to the first gears, said means comprising a pin carried by the lever and shoulders formed on the first gears and engageable by said pin.

4. In combination, a pair of brake bands having corresponding ends fixed, a pair of shafts, one shaft extending through the other and the free ends of the brake bands connected to corresponding ends of the shafts, ears fixed upon the other ends of the shafts, an operating lever, and a gear rotatable on the lever between and meshing with the two first gears.

5. In combination, a cable drum, brake drums upon the ends of the cable drum, brake bands having corresponding ends fixed and extending over the brake drums, a pair of shafts, one shaft extending through the other, the free ends of the brake bands being connected to eccentrics upon corresponding ends of the shaft, gears fixed upon the other ends of the shafts, an operating lever, and a gear rotatable upon the operating lever and arranged between and meshing with the first two gears.

In testimony whereof I have signed my name to this specification.

FRANK L. ODENBREIT.